April 6, 1954  LA VERN H. BECKBERGER  2,674,635
PRODUCTION OF AROMATICS FROM PETROLEUM
Filed May 10, 1950
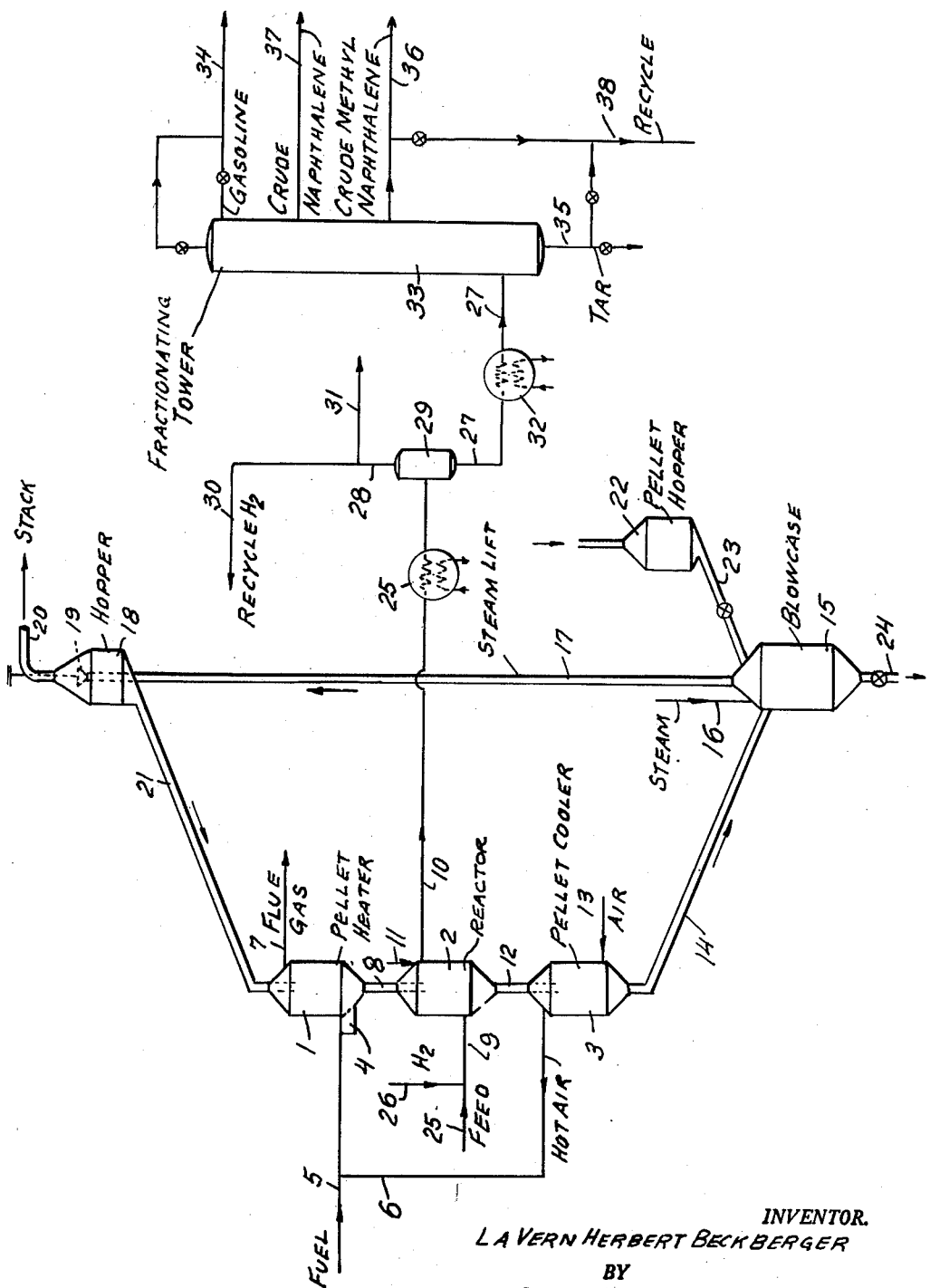
INVENTOR.
LA VERN HERBERT BECKBERGER
BY
Adams, Forward & McLean
ATTORNEYS.

Patented Apr. 6, 1954

2,674,635

UNITED STATES PATENT OFFICE 2,674,635

PRODUCTION OF AROMATICS FROM PETROLEUM

La Vern H. Beckberger, East Chicago, Ind., assignor to Sinclair Refining Company, New York, N. Y., a corporation of Maine Application May 10, 1950, Serial No. 161,211

4 Claims. (Cl. 260—672)

My invention relates to the production of naphthalene in substantial yields from hydrocarbon fractions rich in alkylated fused-ring aromatics, especially cycle stocks, by thermal conversion in the presence of hydrogen.

Conventional cracking operations to prepare useful petroleum products such as gasoline from heavier hydrocarbon fractions is essentially an incomplete process when the total conversion to useful products is considered. In particular, cycle stock, or relatively refractory hydrocarbons boiling in the gas oil range, accumulates in vast quantities. As a result, a difficult problem is presented in handling these cycle stocks to further improve the commercial aspects of cracking operations. Continued recycling of such fractions in the system for additional conversion becomes uneconomical because of their general refractory character. On the other hand, as useful products cycle stocks have extremely limited utility. For instance, as heating oils these hydrocarbons have low or negligible value while their ignition quality is too poor for practical use as diesel fuels.

Cycle stocks are characterized by a high content of alkylated fused-ring aromatic compounds, particularly alkylated naphthalenes such as the methyl naphthalenes. Although these materials have limited present market value and cannot be individually separated, naphthalene itself has a definite market value if prepared at low cost.

I have found that naphthalene can be prepared at low cost, efficiently and in substantial yield from hydrocarbon fractions rich in alkylated fused-ring aromatics, particularly cycle stocks from cracking operations, by thermal conversion in the presence of hydrogen or a hydrogen-rich gas. I have found that reaction conditions are important in the practice of my invention. Essentially, I react the aromatic-rich fraction with hydrogen at a temperature in the range approximately 1300° to 2500° F. The reaction is carried out at these relatively-high temperatures for a period of time sufficient to effect conversion, although generally the holding time will vary between several seconds to thirty or more minutes. The hydrogen or hydrogen-rich gas is present in the amount of about 1 to 20 moles of hydrogen for each mole of hydrocarbon feed, the hydrogen present being calculated as pure $H_2$. Although the pressure reaction conditions offer considerable latitude, I generally employ pressures from about atmospheric to 100 p. s. i., which are particularly attractive from a commercial and economic aspect.

By way of example, I especially contemplate introducing a cycle stock from a conventional cracking operation, rich in alkylated fused-ring aromatics and boiling in the range 400°-600° F., into a reaction zone into which is also passed substantially pure hydrogen. Advantageously, the hydrogen is present as a mixture of the fixed or tail gases from the process itself augmented when necessary by the addition of pure hydrogen. The hydrogen gas (considered as pure hydrogen) to hydrocarbon feed molar ratio is preferably between about 4 to 10. The recation is advantageously carried out at a temperature of about 1600° F. at a pressure of about 30 to 40 p. s. i. g., for a holding time of about 30 seconds or so. The reaction zone may be packed or filled with a suitable inert material to improve and expedite contact and this inert material may be cleaned whenever necessary by passing air through the zone when the system is off-stream. The effluent products from the reaction zone are then fractionated to separate the naphthalene and other useful aromatic products, e. g., benzene, toluene and xylenes. Alkylated fused-ring aromatic compounds, such as methyl naphthalenes, and other heavier unconverted fractions boiling above naphthalene removed from the reaction products may be recycled back to the reaction step along with the tail or fixed gases containing hydrogen.

Although the process according to my invention is especially adaptable to petroleum cycle stocks, which are readily available at low cost and in considerable quantities, other sources of alkylated fused-ring aromatics may be employed. In general, these cycle oils and other similar fractions contain large proportions of compounds with polycyclic aromatic nuclei attached to which are such groups as methyl, ethyl, propyl (or higher) radicals as well as cycloalkyl, e. g. cyclohexyl, and aryl radicals. In particular, I contemplate using hydrocarbon fractions essentially consisting of alkyl, polyalkyl, aryl or polyaryl naphthalene derivatives or any oil containing these derivatives in appreciable amounts. I especially prefer cycle stocks derived from cracking operations such as those boiling in the range of 400°-600° F. Coal tar fractions of similar boiling ranges can also be used. However, certain other heavier fractions rich in alkylated fused-ring aromatics such as derivatives of anthracene and phenanthrene are useful. Pure or highly concentrated naphthalene derivatives are not essential since any non-aromatic constituents in the charge will be hydrocracked to lower boiling hydrocarbon liquids and gases from which naphthalene is removed by distillation. In addition, the presence of non-aromatics and alkylbenzenes in the feed result in the production of benzene, toluene and xylenes, as well as useful hydrocarbon gases, particularly butane. Cycle oils of relatively low aromatic concentration may be initially treated or prepared prior to reaction. For example, solvent extraction with a selective solvent of the nature of furfural or sulfur dioxide will effect separation from non-aromatic constituents present in undesirable amounts.

The advantage of my process derives in large measure from the fact that I do not use any catalyst and that relatively low pressures may be advantageously employed. However, although no catalyst is used, an inert packing material may be employed to improve heat transfer and flow distribution of reactants. Coke may form on this material which is easily removed by passing air through the reactor when the system is off-stream. The pressure conditions may be varied widely, although for economic reasons I prefer relatively low pressures in the range approximating 0 to 100 p. s. i. g. For example, pressures between atmospheric and 30 to 40 p. s. i. g. are advantageous when the reaction is conducted at temperatures in the range of 1400° to 1600° F.

The reaction is carried out at a temperature in the range of about 1300° to 2500° F. Below the lower limit of 1300° F., the yield of naphthalene is unattractive, while thermal environments exceeding 2500° F. are difficult to attain and are impracticable because of present-day equipment limitations. I have found that reaction temperatures between about 1400° F., for a pressure of about 30 to 40 p. s. i. g., to about 1600° to 1650° F., at atmospheric pressure conditions are particularly advantageous.

The holding time of the hydrocarbon feed during conversion in the reaction zone may be varied considerably and should be sufficient to effect the desired conversion. Generally the holding time will vary from several seconds to 30 or more minutes. However, at temperatures in the range approximating 1400° to 1600° F., the holding period is advantageously short, up to about two minutes.

Although it is not necessary to employ pure hydrogen in my process, I prefer to use hydrogen in the highest concentration that is economically feasible. However, mixtures of hydrogen with other gases or compounds which decompose or react so as to make hydrogen available for the reaction can be used. I particularly contemplate using, for economic reasons, the non-condensible or tail gases from the effluent gases of the reaction which are rich in hydrogen and which may be augmented where necessary by adding substantially pure hydrogen. However, as other examples, I suggest water gas synthesis gas, mixtures of hydrogen with steam or coal gas, etc. Although steam alone is not satisfactory it may be used in admixture with hydrogen since some hydrogen is liberated in situ by the water gas reaction. However, other diluent gases, such as nitrogen or propane are not satisfactory since, for instance, they result in appreciably lower yields and coke formation. I use about 1 to 20 moles of the hydrogen gas, calculated as pure $H_2$, for each mole of the hydrocarbon feed. Under the lower limit of about 1 mole (for each mole of feed) the yield of naphthalene is relatively unattractive, while using over 20 moles requires excessive recycling for only very small improvements in naphthalene yield.

The effluent products from the hydrodealkylation of alkylated fused-ring aromatics formed according to my process are fractionated to yield chiefly naphthalene of good commercial grade. For instance, naphthalene of about 85% purity obtained from a 400°–600° F. boiling cycle oil is readily marketable, while even redistillation to a premium product of upwards of 90% purity is usually warranted. The effluent from conversions at over 1600° F. usually contain naphthalene in extremely high purity, while the effluent from the lower-temperature reactions may require work-up, say by solvent extraction, to prepare a more useful product. Besides naphthalene, other valuable dealkylated aromatics result from the conversion reaction, such as motor fuel constituents, which have additional utility.

The following examples are intended to more clearly illustrate my invention.

*Example I*

A methyl naphthalene fraction, containing over 99% methyl naphthalene, was introduced into a reaction chamber packed with ceramic beads, leaving 40% voids by volume, at a liquid space velocity of about 0.6 volume of liquid feed per volume of beads per hour. Hydrogen was introduced into the same reaction chamber in molecular ratio to the hydrocarbon feed of 7.7 and the reaction carried out at a temperature reaching a peak of 1590° F. The following products were obtained by weight, as based on the feed:

| | Per cent |
|---|---|
| Naphthalene | 54.2 |
| Methylnaphthalene | 19.8 |
| Bottoms | 12.3 |
| Coke | 2.5 |
| Methane | 8.4 |
| Loss | 2.8 |

*Example II*

A dimethyl naphthalene fraction, 90% distilling between 255°–270° C., was introduced into a reaction chamber packed with ceramic beads (40% voids) at a liquid space velocity of 0.6 v./v./hr. Hydrogen was introduced into the same reaction vessel in molecular ratio to the hydrocarbon feed of 9.4 and the reaction was carried out at a temperature reaching a peak of 1590° F. The following products, by weight, were obtained as based on the feed:

| | Per cent |
|---|---|
| Gasoline | 3.0 |
| Naphthalene | 31.8 |
| Methylnaphthalene | 25.6 |
| Bottoms | 21.5 |
| Coke | 3.0 |
| Methane | 13.1 |
| Ethylene | 2.0 |

*Example III*

Methylnaphthalene was introduced into a reaction chamber packed with ceramic beads (40% voids) at the rate of 93.3 cc./hr. (0.657 mole/hr.). Hydrogen was introduced into the same reaction vessel at the rate of 125 liters/hr. (5.08 moles/hr.), which is equivalent to a molar ratio of hydrogen to the hydrocarbon feed of 7.74. The reaction was carried out at a temperature reaching a peak of about 1590° F. and for 119 minutes. The following liquid products were recovered by weight, as based upon the feed:

| | Per cent |
|---|---|
| Naphthalene | 54.2 |
| Methylnaphthalene | 19.8 |
| Bottoms | 12.3 |

2.5% coke was recovered as well as 8.4% of $C_1$ gases. There was a loss of 2.8%, while the ultimate yield of naphthalene was 67.7%.

*Example IV*

Methylnaphthalene was introduced into a reaction vessel packed with ceramic beads (40% voids) at the rate of 76.2 cc./hr. (0.537 mole/hr.). However, instead of hydrogen, nitrogen was introduced into the same reaction vessel at the rate of 125 liters/hr. (5.08 moles/hr.), which is equivalent to a molar ratio of nitrogen to the hydrocarbon feed of 9.46. The reaction was carried out at a temperature reaching a peak of about 1595° F. and for 35 minutes. The following liquid products were recovered by weight, as based upon the feed:

| | Per cent |
|---|---|
| Naphthalene | 9.7 |
| Methylnaphthalene | 51.8 |
| Bottoms | 18.6 |

5.6% coke was recovered as well as 2.0% of $C_1$ gases and 0.2% hydrogen gas. There was a loss of 12.1%, while the ultimate yield of naphthalene was only 20.1%. The naphthalene yield was considerably lower than hydrogen and more coke formed when these results are contrasted with the other examples employing $H_2$.

*Example V*

Methylnaphthalene was introduced into a reaction chamber packed with ceramic beads (40% voids) at the rate of 80.3 cc./hr. (0.566 mole/hr.). Water as liquid was introduced into the same reaction vessel at the rate of 75 cc./hr. (4.17 moles/hr.), which is equivalent to a molar ratio of water to the hydrocarbon feed of 7.37. The reaction was carried out at a temperature reaching a peak of about 1615° F. and for 99 minutes. The following liquid products were recovered by weight, as based upon the feed:

| | Per cent |
|---|---|
| Gasoline | 1.1 |
| Naphthalene | 25.0 |
| Methylnaphthalene | 30.2 |
| Bottoms | 24.6 |

9.3% coke was recovered as well as 4.4% of $C_1$ gases, 0.3% of $C_2^=$ gases and 2.4% of $C_3$ gases. Carbon present as CO and $CO_2$ was 2.7% while the ultimate yield of naphthalene was 37.1%. Again, without hydrogen, the naphthalene yield was considerably lower and more tar and coke formed when the results are contrasted with the other examples employing $H_2$. The yield itself probably was higher (than in the case of $N_2$ and $C_3H_8$) because hydrogen was probably formed by the water gas reaction.

*Example VI*

Methylnaphthalene was introduced into a reaction chamber packed with ceramic beads (40% voids) at the rate of 70.0 cc./hr. (0.492 mole/hr.). Propane was introduced into the same reaction vessel at the rate of 70 liters/hr.), which is equivalent to a molar ratio of propane to the hydrocarbon feed of 5.78. The reaction was carried out at a temperature reaching a peak of about 1610° F. and for 90 minutes. The following liquid products were recovered by weight, as based upon the total feed:

| | Per cent |
|---|---|
| Gasoline | 3.4 |
| Naphthalene | 9.0 |
| Methylnaphthalene | 5.4 |
| Bottoms | 18.0 |

5.7% coke was recovered as well as 18.7% of $C_1$ gases, 1.8% of $C_2^=$, 19.1% of $C_2$, 0.1% of $C_3$ and 1.8% of $C_3^=$. There was a loss of 17.0%, while the ultimate yield of naphthalene was 29.6%. Again, without hydrogen, the naphthalene yield was considerably lower and more tar and coke formed when the results are contrasted with the other examples employing $H_2$.

*Example VII*

Methylnaphthalene was introduced into a reaction vessel packed with ceramic beads (40% voids) at a liquid space velocity of 0.64 v./v./hr. A hydrogen-rich gas was introduced into the same reaction vessel at a molecular ratio to the hydrocarbon feed of 8.0, as based on the pure hydrogen. The reaction was carried out at a temperature reaching a peak of 1200° F. and for a period of three hours at 40 p. s. i. g. As based on the feed 92.0% by weight of liquid products were recovered, 0.4% of gases, there was a trace of coke formed and a loss of 7.6%. The effluent gases analyzed as follows by mole percentage:

| | |
|---|---|
| Hydrogen | 97.1 |
| Methane | 1.4 |
| Other gases | 1.5 |

The liquid product distilled into following components by weight (per cent):

| | |
|---|---|
| IBP–400° F | 0.0 |
| 400°–460° | 10.1 |
| 460°–480° | 80.6 |
| Bottoms | 9.3 |

An analysis of these liquid products showed the following components by weight as based on the charge (per cent):

| | |
|---|---|
| Gasoline | 0.0 |
| Naphthalene | 4.2 |
| Methylnaphthalene | 64.0 |

The ultimate yield of naphthalene was 11.6%. The particularly poor yield derives in large measure from the reaction temperature which is below the lower limit of 1300° F. of my process.

*Example VIII*

Methylnaphthalene was introduced into a reaction vessel packed with ceramic beads (40% voids) at a space velocity of 0.65 v./v./hr. A hydrogen-rich gas was introduced into the same reaction vessel at a molecular ratio to the hydrocarbon feed of 8.0, as based on the pure hydrogen. The reaction was carried out at a temperature reaching a peak of 1300° F. and for a period of two hours at 35 p. s. i. g. As based on the feed 96.0% by weight of liquid products were recovered, 1.9% of gases, there was a trace of coke and a loss of 2.1%. The effluent gases analyzed as follows; by mole percentage:

| | |
|---|---|
| Hydrogen | 86.9 |
| Methane | 7.7 |
| Other gases | 5.4 |

The liquid product distilled into the following components by weight (per cent):

| | Per cent |
|---|---|
| IBP–400° F | 2.4 |
| 400°–460° | 20.3 |
| 460–480° | 66.7 |
| Bottoms | 10.6 |

An analysis of these liquid products showed the following components by weight as based on the charge (per cent):

| | |
|---|---|
| Gasoline | 2.3 |
| Naphthalene | 21.0 |
| Methylnaphthalene | 61.8 |

The ultimate yield of naphthalene was 55.0%.

Example IX

Methylnaphthalene is introduced into a reaction vessel packed with ceramic beads (40% voids) at a space velocity of 0.58 vol. feed/vol. beads/hr. A hydrogen-rich gas was introduced into the same reaction vessel at a molecular ratio to the hydrocarbon feed of 8.0, as based on the pure hydrogen. The reaction was carried out at a temperature reaching a peak of 1400° F. and for a period of 1.5 hours at 30 p. s. i. g. As based on the weight of the feed 88.8% by weight of liquid products were recovered, 4.8% of gases, there was a trace of coke and a loss of 6.6%. The effluent gases analyzed as follows by mole percentage:

| | |
|---|---|
| Hydrogen | 67.1 |
| Methane | 13.3 |
| Other gases | 19.6 |

The liquid product distilled into following components by weight (per cent):

| | |
|---|---|
| IBP–400° F | 0.5 |
| 400°–460° | 45.6 |
| 460°–480° | 40.8 |
| Bottoms | 12.6 |

An analysis of these liquid products showed the following components by weight as based on the charge (per cent):

| | |
|---|---|
| Gasoline | 0.4 |
| Naphthalene | 38.8 |
| Methylnaphthalene | 34.4 |

The ultimate yield of naphthalene was 59%.

Example X

A 400°–480° F. cut of a light cycle oil, obtained from thermally cracking gas oil, was pyrolyzed over ceramic beads (40% voids) in a quartz tube at 1585° F. in the presence of 8.0 moles of hydrogen per mole of hydrocarbon feed. The cycle oil contained 56% by volume of aromatics, 6.8% by volume of olefins and had an A. P. I. gravity of 21.6°. The oil was introduced at a liquid space velocity of 0.55 v./v./hr. The weight per cent of the product yield, based on the total oil charged, was as follows:

| | |
|---|---|
| 410° F. E. P. ASTM gasoline | 15.7 |
| Naphthalene | 20.5 |
| Methylnaphthalene | 7.3 |
| Bottoms | 14.1 |
| Coke | 3.0 |
| Ethylene | 13.9 |
| Other light hydrocarbon gases | 23.3 |
| Loss | 2.2 |

The hydrogen consumption was 600 cubic feet (at S. T. P.) per barrel of oil charged. The gasoline contained 37% by weight of benzene, 31% by weight of toluene and 15% by weight of xylenes.

Example XI

A 400°–480° F. cut of a light cycle oil, obtained from thermally cracking gas oil, was extracted with sulfur dioxide at 18° F., at a 1.5/1.0 solvent to oil volume ratio. The oil extract contained 7.0% of olefins and 70% aromatics and had an A. P. I. gravity of 17.6°. The extracted oil was then pyrolyzed over ceramic beads (40% voids) in a quartz tube at 1610° F. in the presence of 8.0 moles of hydrogen per mole of oil. The oil was introduced at a liquid space velocity of 0.51 v./v./hr. The weight per cent of the product yield, based on the total oil charged, was as follows:

| | |
|---|---|
| 410° F. E. P. ASTM gasoline | 8.5 |
| Naphthalene | 32.6 |
| Methylnaphthalene | 12.3 |
| Bottoms | 16.3 |
| Coke | 3.2 |
| Ethylene | 8.3 |
| Other light hydrocarbon gases | 17.9 |
| Loss | 0.9 |

The hydrogen consumption was 1400 cubic feet (at S. T. P.) per barrel of oil charged. The gasoline contained 27% by weight of benzene, 29% by weight of toluene and 13% by weight of xylenes.

Example XII

A 442°–480° F. cut of a light cycle oil, obtained from a fluid catalyst cracking operation, was extracted with furfural. The oil extract contained 87% by weight of aromatics, of which 59% was methylnaphthalene. The extracted oil was then pyrolyzed over ceramic beads (40% voids) in a quartz tube at 1635° F. in the presence of 8.0 moles of hydrogen per mole of oil. The oil was introduced at a liquid space velocity of 0.56 v./v./hr. The weight per cent of the product yield, based on the total oil charged, was as follows:

| | |
|---|---|
| 410° F. E. P. ASTM gasoline | 10.0 |
| Naphthalene | 35.8 |
| Methylnaphthalene | 6.4 |
| Bottoms | 14.5 |
| Coke | 3.0 |
| Ethylene | 6.7 |
| Other liquid hydrocarbon gases | 15.7 |
| Loss | 7.9 |

The hydrogen consumption was 818 cubic feet (at S. T. P.) per barrel of oil charged. The gasoline contained 26% by weight of benzene, 19% by weight of toluene and 10% by weight of xylenes.

The accompanying drawing is a flow diagram illustrating somewhat schematically a continuous process according to my invention.

In the process illustrated in the drawing, vessels 1, 2 and 3 are insulated, refractory-lined chambers filled with refractory spherical pellets of ceramic composition. Vessel 1 is used for heating the pellets, vessel 2 for carrying out the reaction with the heated pellets while vessel 3 is a cooling zone for the hot pellets from the reactor 2. The pellets are heated in vessel 1 by combustion gases from furnace 4, supplied by fuel from line 5 and preheated air from line 6. Flue gases are removed from vessel 1 by line 7. The heated pellets pass to chamber 2 by line 8 at a rate and temperature necessary to obtain the desired thermal conditions. The reactants are introduced by line 9 while the reaction products are taken off by line 10. Water quench 11 is provided to cool the hot effluent vapors from the reactor 2. The hot pellets from the reaction zone pass by line 12 to cooler 3. Air is introduced by line 13 and taken off by line 6 where it is passed in heated condition to the furnace 4 of the heater 1. The air also serves to remove any coke formed on the pellets during reaction. The cooled pellets pass by pipe 14 to blowcase 15. Steam is injected in blowcase by line 16 to recirculate the pellets, the steam acting to lift the pellets up pipe 17 to hopper 18. Plate control 19 is provided in hopper 18 to regulate displacement of the ascending pellets. Steam from the lift passes to the stack by line 20. The pellets recirculate to the heater 1 by line 21. Pellet hopper 22 supplies makeup and startup for the system by line 23. Line 24 is provided for withdrawing pellets from the system as desired.

According to the process as illustrated, a cycle stock from a cracking operation, boiling in the range of 400°–600° F. and rich in alkylated fused-ring aromatics is introduced by line 25 advantageously preheated to a temperature of about 500° to 700° F. The hydrogen for reaction is charged by line 26 and admixed with the cycle oil in line 9 and the mixture passed into reactor 2. The hydrogen gases advantageously comprise the hydrogen-rich tail gases separated from the reaction products. The reaction mixture is heated in reactor 2 to a temperature in the range of about 1300° to 2500° F. and at a pressure between 0 to 100 p. s. i. g. The hydrogen gas and the charge oil introduced are regulated so that a molar ratio of about 1 to 20 is obtained, calculated as pure hydrogen to oil. Reaction takes place for a holding time varying between several seconds to 30 or more minutes. Advantageously, the reaction is carried out at 1440° to 1600° F. at 30 to 40 p. s. i. g. for a holding time of 30 seconds or so. After quenching the effluent gases are taken off by line 10, and additionally cooled to about 300°–400° F. in waste heat boiler 25. The cooled products are passed to a liquid separation zone 29, a knockout drum, where the partially-condensed hydrocarbons are removed by line 27. The non-condensible or fixed gases rich in hydrogen are removed by line 28 and then may be recycled back to the reaction zone 2 by line 30. The non-condensible gases may be removed from the system as desired by bleed line 31. The liquid products separated out in knockout drum 29 are preheated by heater 32 and then introduced by line 27 into fractionating zone 33 for separation into useful constituents. From the fractionating zone 33, the gasoline range-boiling constituents are removed as overhead by line 34, tar as bottoms by line 35, a crude methyl naphthalene fraction by line 36 and a crude naphthalene fraction by line 37. The gasoline and naphthalene fractions are passed to storage or may be redistilled for additional purity. Crude methyl naphthalene and the bottoms tar may be recycled as desired by line 38 to be admixed with the charge stock.

I claim:
1. The method of thermally converting higher molecular weight hydrocarbon fractions rich in alkylated fused-ring aromatic compounds to lower molecular weight hydrocarbons which consists of passing the hydrocarbon fraction into a reaction zone in the presence of a hydrogen-rich gas, the hydrogen being present in the amount of about 1 to 20 moles of hydrogen for each mole of the hydrocarbon fraction, maintaining the reaction zone in absence of a substantially effective amount of catalytic material and at a temperature in the range approximating 1300° to 2500° F. and at a pressure in the range approximating 0 to 100 p. s. i. g. for a period of time sufficient to effect conversion, and separating the lower molecular weight hydrocarbons from the effluent reaction products.

2. The method according to claim 1 wherein the hydrogen-rich tail gases are separated from the effluent reaction products and are recycled to the reaction zone.

3. The method of preparing naphthalene from cycle stocks rich in alkylated naphthalenes by thermal conversion in the presence of hydrogen which consists of passing the cycle stock into a reaction zone in the presence of a hydrogen-rich gas, the hydrogen being present in the amount of about 1 to 20 moles of hydrogen for each mole of the cycle stock, maintaining the reaction zone in absence of a substantially effective amount of catalytic material and at a temperature in the range approximating 1300° to 2500° F. and at a pressure in the range approximating 0 to 100 p. s. i. g. for a period of time sufficient to effect conversion, separating the tail gases from the effluent reaction products and recycling said gases to the reaction zone, and fractionally distilling the liquid reaction products to separate therefrom naphthalene.

4. The method of preparing naphthalene from alkylated naphthalenes by thermal conversion in the presence of hydrogen which consists of passing the alkylated naphthalenes into a reaction zone in the presence of a hydrogen-rich gas, the hydrogen being present in the amount of about 1 to 20 moles of hydrogen for each mole of alkylated naphthalenes, maintaining the reaction zone in absence of a substantially effective amount of catalytic material and at a temperature in the range approximating 1300° to 2500° F. and at a pressure in the range approximating 0 to 100 p. s. i. g. for a period of time sufficient to effect conversion, separating the tail gases from the effluent reaction products and recycling said gases to the reaction zone, and fractionally distilling the liquid reaction products to separate therefrom naphthalene.

References Cited in the file of this patent
UNITED STATES PATENTS

| Number | Name | Date |
|---|---|---|
| 2,167,339 | Sweeney | July 25, 1939 |
| 2,335,596 | Marschner | Nov. 30, 1943 |